(12) United States Patent
Polansky et al.

(10) Patent No.: US 9,266,621 B2
(45) Date of Patent: Feb. 23, 2016

(54) DISPLAY SYSTEMS AND METHODS FOR PROVIDING DISPLAYS INDICATING A REQUIRED TIME OF ARRIVAL

(71) Applicant: HONEYWELL INTERNATIONAL INC., Morristown, NJ (US)

(72) Inventors: Michal Polansky, South Moravia (CZ); Jiri Vasek, South Moravia (CZ); Bretislav Passinger, Prerov (CZ); Jiri Svoboda, Novy Jicin (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 39 days.

(21) Appl. No.: 13/964,759

(22) Filed: Aug. 12, 2013

(65) Prior Publication Data

US 2015/0045989 A1 Feb. 12, 2015

(51) Int. Cl.
*B64D 45/00* (2006.01)
*G01C 23/00* (2006.01)

(52) U.S. Cl.
CPC ............... *B64D 45/00* (2013.01); *G01C 23/00* (2013.01)

(58) Field of Classification Search
CPC ....................................................... B64D 45/00
USPC ........................................................ 701/2, 3
See application file for complete search history.

(56) References Cited

U.S. PATENT DOCUMENTS

| | | | |
|---|---|---|---|
| 7,623,960 B2 | 11/2009 | Wise et al. | |
| 7,756,632 B2 | 7/2010 | Wise et al. | |
| 7,765,061 B1 | 7/2010 | Barber et al. | |
| 8,014,907 B2 | 9/2011 | Coulmeau | |
| 8,150,588 B2 | 4/2012 | Klooster | |
| 8,244,466 B2 | 8/2012 | DeJonge et al. | |
| 8,396,614 B1 | 3/2013 | Pschierer | |
| 2007/0100538 A1 | 5/2007 | Wise et al. | |
| 2010/0114406 A1* | 5/2010 | DeJonge et al. | 701/3 |
| 2010/0152930 A1 | 6/2010 | Coulmeau et al. | |
| 2012/0253650 A1 | 10/2012 | Wachenheim et al. | |

FOREIGN PATENT DOCUMENTS

EP 2568256 A2 * 3/2013

OTHER PUBLICATIONS

EP Extended Search Report for Application No. 14179151.7 dated Jan. 12, 2015.

* cited by examiner

*Primary Examiner* — Fadey Jabr
*Assistant Examiner* — Yazan A Soofi
(74) *Attorney, Agent, or Firm* — Ingrassia Fisher & Lorenz, P.C.

(57) ABSTRACT

A method for providing a display to a flight crew of an aircraft includes receiving a required time of arrival (RTA) control instruction for arriving at a particular waypoint at a particular time, calculating an initial required aircraft speed at which the aircraft is required to fly in order to arrive at the particular waypoint at the particular time, and providing a flight display comprising a speed tape. The method further includes receiving an input accepting the RTA control instruction and calculating an updated required aircraft speed at which the aircraft is required to fly in order to arrive at the particular waypoint at the particular time. Still further, the method includes updating the flight display comprising displaying the updated RTA target speed on the speed tape using a second symbology that is different from the first symbology and discontinuing the display of the first symbology.

18 Claims, 7 Drawing Sheets

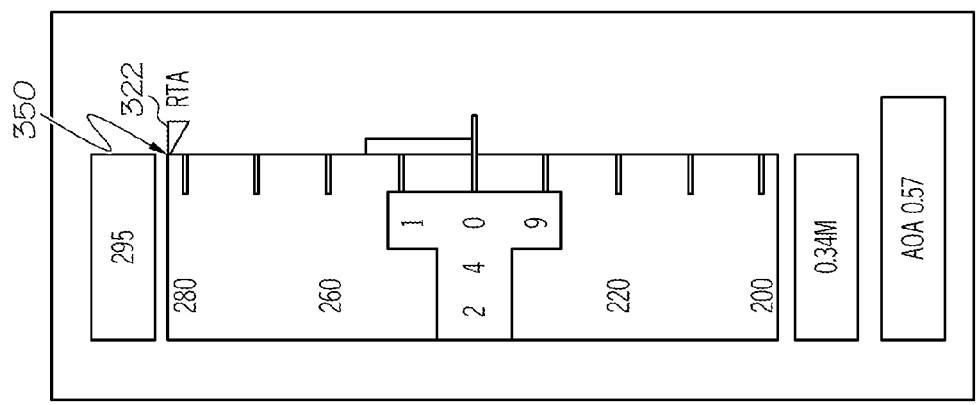
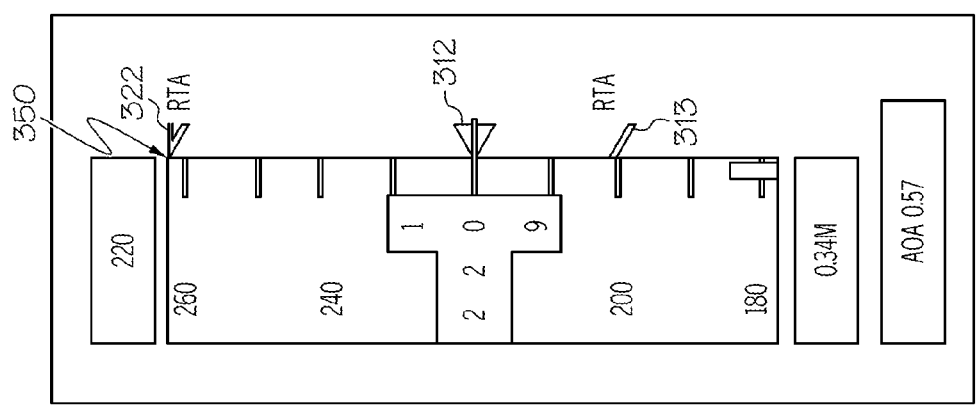

DISPLAY SYSTEMS AND METHODS FOR PROVIDING DISPLAYS INDICATING A REQUIRED TIME OF ARRIVAL

TECHNICAL FIELD

The present disclosure generally relates to display systems, including aircraft display systems, and methods for providing displays. More particularly, the present disclosure relates to display systems and methods for providing displays indicating a required time of arrival.

BACKGROUND

The ever increasing amount of air traffic has caused a marked increase in the workload of air traffic controllers in high traffic density areas around airports. The Next Generation (NextGen) overhaul of the United States airspace system and the companion Single European Sky ATM Research (SESAR) overhaul of the European airspace system are proposing various trajectory-based mechanisms to ease the pressures on the air traffic management on those continents. Some solutions being suggested include the increased use of onboard Required Time of Arrival (RTA) systems that allow an aircrew limited control of aircraft spacing and separation in areas where ATC personnel face heavy workloads.

A flight management system (FMS) is an onboard system that may include RTA capability. This RTA capability allows an aircraft to "self-deliver" to a specified waypoint or waypoints of a flight plan at a specified time along a four-dimensional trajectory (latitude, longitude, altitude, and time). The RTA system may be used within the context of a Controlled Time of Arrival (CTA) system to help manage the burden on an air traffic control (ATC) system resource.

These RTA systems may also be used to control speed transitions in multi-segment flight plans. Flight plans are developed in segments between "waypoints," or points in space defined by latitude, longitude, an altitude. These segments have physical or regulatory maximum and minimum airspeed constraints. Further, one or more waypoints in the flight plan may have an RTA assigned to those waypoints, which may be a specific arrival time (i.e. an "At Time RTA") or may be a one sided restriction such as arriving "no earlier than" or "no later than" a specific time.

Notwithstanding the numerous advantages of the NextGen and SESAR programs, a significant problem has arisen with respect to the capabilities of existing navigation systems that limit the ability of aircraft to reliably meet the air route (waypoint) time constraints imposed. For example, there are numerous onboard aircraft, ship-borne, and motor vehicle navigation systems that may calculate and display an Estimated Time of Arrival (ETA). However, there is no navigation system currently available that displays an indication to an operator that allows the operator to determine whether or not a required waypoint time constraint may be reliably satisfied.

Accordingly, it would be advantageous to have a system and method that may compute an aircraft's motion in four dimensions (e.g., three spatial dimensions and time) and reliably predict the aircraft's arrival time at a predetermined waypoint, by providing a graphical display to an operator of the aircraft's progress that enables the operator to adjust the aircraft's movement and achieve the desired arrival time. Furthermore, other desirable features and characteristics of the present disclosure will become apparent from the subsequent detailed description of the inventive subject matter and the appended claims, taken in conjunction with the accompanying drawings and this background of the inventive subject matter.

BRIEF SUMMARY

Display systems and methods for providing displays are disclosed. In one exemplary embodiment, a method for providing a display to a flight crew of an aircraft includes receiving a required time of arrival (RTA) control instruction for arriving at a particular waypoint at a particular time, calculating an initial required aircraft speed at which the aircraft is required to fly in order to arrive at the particular waypoint at the particular time, and providing a flight display comprising a speed tape. The speed tape comprises an initial RTA target speed that is graphically displayed using a first symbology. The initial RTA target speed correlates with the initial required aircraft speed. Further, providing the flight display in the above noted manner does not require a concurrent aircraft speed change to match the initial target speed. The method further includes receiving an input accepting the RTA control instruction and calculating an updated required aircraft speed at which the aircraft is required to fly in order to arrive at the particular waypoint at the particular time. If a change in flight conditions has occurred between the steps of calculating the initial required aircraft speed and calculating the updated required aircraft speed, the updated required aircraft speed is either faster or slower than the required aircraft speed. Still further, the method includes updating the flight display comprising displaying the updated RTA target speed on the speed tape using a second symbology that is different from the first symbology and discontinuing the display of the first symbology and providing an instruction to the autothrottle of the aircraft to fly the aircraft at the updated RTA target speed.

In another exemplary embodiment, a display system configured to provide a display to a flight crew of an aircraft includes an image display device, a communications interface; a data storage device that stores navigation information; a flight management system that includes an autothrottle functionality, and an RTA control system in operable electronic communication with the image display device, the communications interface the data storage device, and the flight management system. The RTA control system includes a computer processor that is configured to receive a required time of arrival (RTA) control instruction through the communications interface for arriving at a particular waypoint at a particular time, calculate an initial required aircraft speed at which the aircraft is required to fly in order to arrive at the particular waypoint at the particular time, and generate and send to the image display device a flight display comprising a speed tape. The speed tape includes an initial RTA target speed that is graphically displayed using a first symbology. The initial RTA target speed correlates with the initial required aircraft speed. Further, generating the flight display is not accompanied with a concurrent aircraft speed change command to the flight management system to match the initial target speed. The computer processor is further configured to receive an input accepting the RTA control instruction through the communications interface and calculate an updated required aircraft speed at which the aircraft is required to fly in order to arrive at the particular waypoint at the particular time. If a change in flight conditions has occurred between calculating the initial required aircraft speed and calculating the updated required aircraft speed, the updated required aircraft speed is either faster or slower than the required aircraft speed. Still further, the computer processor is configured to generate and send to the image display device an updated flight display comprising the updated RTA target speed on the speed tape using a second symbology that is different from the first symbology and discontinue the display of the first symbology and provide an instruction to the flight management system to cause the autothrottle of the aircraft to fly the aircraft at the updated RTA target speed.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein:

FIGS. 6A and 6B illustrate a portion of an exemplary flight display wherein either/both of a target speed and an RTA speed range are beyond the bounds of the display.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The present disclosure generally provides systems and methods for displaying the speed impacts of the time constraint on the Primary Flight Display (PFD) of an aircraft, while the aircraft is in a "negotiation" phase and an "execution phase" of such time constraint. The display provides to the pilot (or aircrew) an overview of impacts of the RTA control strategy on aircraft speed in form of speed range indication and RTA target control speed. In the first, negotiation phase, the pilot needs to investigate the impact of the potential RTA constraint on the aircraft speed profile in order to decide whether the clearance is acceptable or not. If the pilot decides to accept the RTA constraint, the second, monitoring phase, is started. In this phase, the pilot needs continuous information about the aircraft systems' management of the RTA constraint. The two phases relate to different needs of the pilot which results in different ways of presentation of the RTA speed data as defined in greater detail below.

Figure 1:
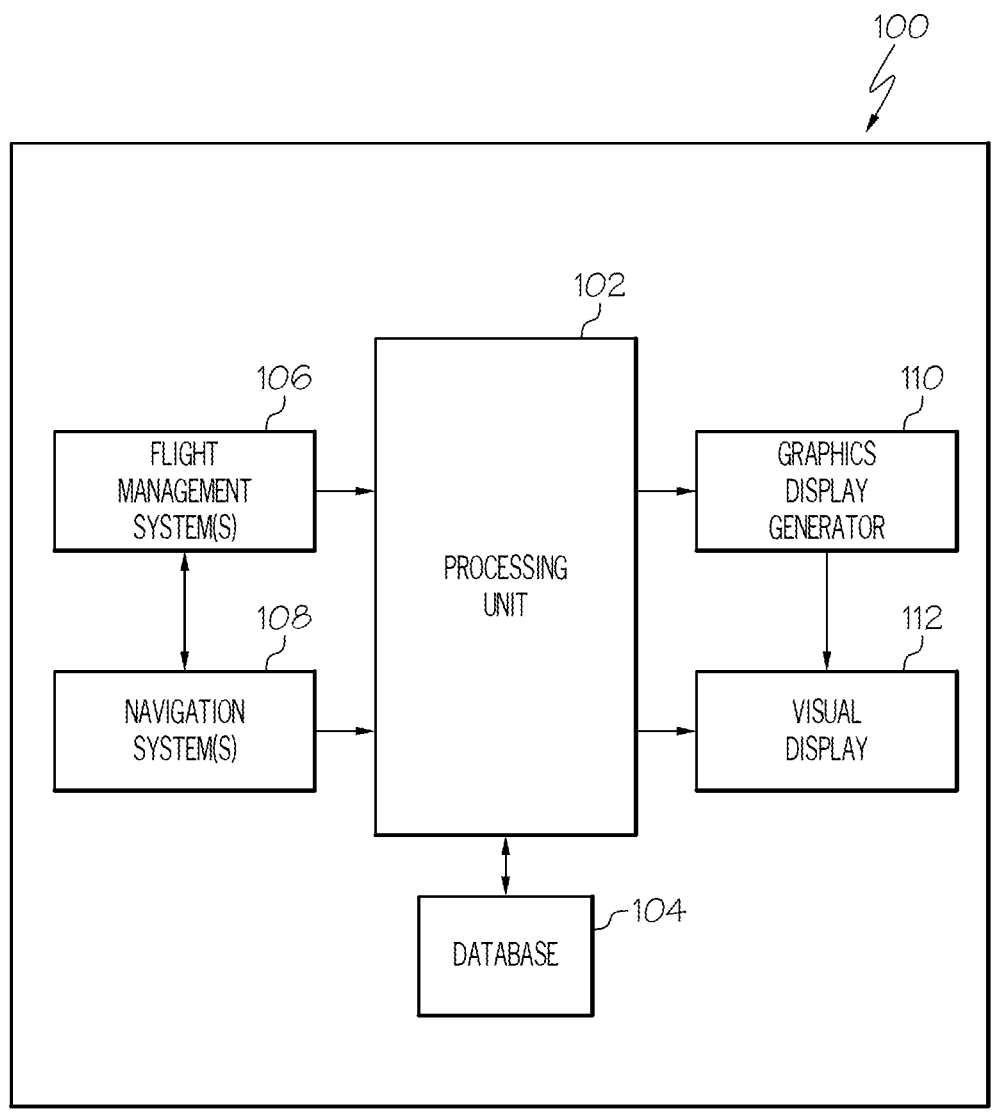
FIG. 1 is a block diagram of an exemplary flight display system in accordance with various embodiments of the present disclosure.

With reference now to the figures, FIG. 1 depicts a block diagram of an exemplary aircraft navigation and control system 100, which may be used to implement various embodiments of the present disclosure. In these embodiments, system 100 computes the movement of an aircraft in four dimensions (x, y, z, t), predicts its arrival time at a predetermined waypoint, and displays (in a highly intuitive format) the aircraft's progress in achieving that desired arrival time. The display and method of operation of the display vary depending on whether the system is operating in the "negotiation phase" or the "execution phase" of the time constraint (RTA) implementation.

For this exemplary embodiment, system 100 includes a processing unit 102, a database 104, a flight management system 106, a navigation system 108, a graphics display generator 110, and a visual display 112. Notably, it should be understood that although system 100 appears in FIG. 1 to be arranged as an integrated system, the present disclosure is not intended to be so limited and may also include an arrangement whereby one or more of processing unit 102, database 104, flight management system 106, navigation system 108, graphics display generator 110, and visual display 112 is a separate component or a subcomponent of another system located either onboard or external to an aircraft. Also, for example, system 100 may be arranged as an integrated system (e.g., aircraft display system, Primary Flight Display system, etc.) or a subsystem of a more comprehensive aircraft system (e.g., flight management system, navigation and control system, target aiming and control system, collision alert and/or avoidance system, weather avoidance system, etc.). Furthermore, the present disclosure is not limited to aircraft displays, and system 100 may also be implemented for other types of vehicles' electronic displays (such as, for example, spacecraft navigation displays, ship navigation displays, submarine navigation displays, train navigation displays, motor vehicle navigation displays, etc.).

For this embodiment, processing unit 102 may be a computer processor such as, for example, a microprocessor, digital signal processor, or any suitable processor capable of at least receiving and/or retrieving aircraft flight management information (e.g., from flight management system 106), navigation and control information (e.g., from navigation system 108), terrain information, including waypoint data and coordinate data for airports, runways, natural and man-made obstacles, etc. (e.g., from database 104), generating display control signals for a visual display of the aircraft flight management information, the navigation and control information (including, for example, a zero pitch reference line, one or more heading indicators, tapes for airspeed and altitude, etc.), the terrain information, and sending the generated display control signals to a graphics display generator (e.g., graphics display generator 110) associated with an onboard visual display (e.g., visual display 112).

For example, processing unit 102 may be arranged as a single processor or plurality of processors connected to a data communications bus or system bus. A memory controller/cache may also be connected to the data communications bus or system bus, which may provide an interface between processing unit 102 and a local memory (e.g., RAM, ROM, etc.). A plurality of machine instructions may be stored in the local memory and retrieved and operated on by processing unit 102 to generate the control signals for the graphics display generator 110 and visual display 112. An Input/Output (I/O) bus bridge may also be connected to the data communications bus or system bus, which may provide an interface between processing unit 102 and an I/O bus. Thus, processing unit 102 may receive, retrieve and/or send data via such an I/O bus. In any event, those of ordinary skill in the art will appreciate that the hardware described herein for processing unit 102 in FIG. 1 may vary. As such, the depicted example is provided for illustrative purposes and not meant to imply any architectural limitations with respect to the present disclosure.

For this exemplary embodiment, system 100 also includes database 104 coupled to processing unit 102 (e.g., via an I/O bus connection). For example, database 104 may be a memory device (e.g., non-volatile memory, disk, drive, tape, optical storage device, mass storage device, etc.) that may store digital target location data, terrain data and waypoint data (e.g., latitudinal and longitudinal data) as either absolute coordinate data or as a function of an aircraft's position. A source for the digital target location data, terrain data, and/or waypoint data stored in database 104 may be, for example, a United States Geological Survey (USGS) map having a resolution of approximately 90 meters, which includes topographical relief information that may be used to apply grid lines following the contour of terrain. As such, database 104 may store a location database that includes data defining the actual geographical boundaries of numerous airports and runway.

Database 104 may also include, for example, a terrain database, which may include the locations and elevations of natural terrain obstacles such as mountains or other elevated ground areas, and also the locations and elevations of man-made obstacles such as radio antenna towers, buildings, bridges, etc. A terrain database stored in database 104 may also include, for example, the boundaries of restricted airspace, restricted elevations for particular airspace, bodies of water, etc. As yet another example, a terrain database stored in database 104 may be a Jeppesen®-styled database, which may cover, for example, a 300 by 270 mile area of terrain and include topographical relief information. As still another example, airport and runway location data and terrain data stored in database 104 may be received from an onboard device that senses and maps man-made obstacles (e.g., airports, runways, etc.) and variations in terrain, such as, for example, a Forward Looking Infrared (FLIR) sensor, or an active or passive type of radar device. As another example, airport and runway location data, and other types of high priority target data (e.g., locations of incoming traffic to avoid, constructed waypoints, obstacles in the aircraft's flight path, etc.) may be retrieved and/or received by processing unit 102 from a suitable source of such data, such as, for example, an onboard flight management system database (e.g., a component of flight management system 106), an onboard navigation database (e.g., a component of navigation system 108), an onboard FLIR sensor or radar device, or an external database (e.g., via a data communication up-link).

For this embodiment, system 100 also includes flight management system 106 and navigation system 108 coupled to processing unit 102 (e.g., via a respective I/O bus connection). Notably, flight management system 106 and navigation system 108 are depicted as separate components in the example embodiment of system 100. Alternatively, flight management system 106 and navigation system 108 and/or their functions of flight management, navigation and control may be combined in one system (e.g., in flight management system 106), or navigation system 108 may be a subsystem of flight management system 106. In any event, flight management system 106 and/or navigation system 108 may provide navigation data associated with the aircraft's current position and flight direction (e.g., heading, course, track, etc.) to processing unit 102. As such, navigation system 108 may include, for example, an inertial navigation system, a satellite navigation system (e.g., Global Positioning System) receiver, VLF/OMEGA, Loran C, VOR/DME, DME/DME, IRS, aircraft attitude sensors, or the navigation information may come from flight management system 106. The navigation data provided to processing unit 102 may also include information about the aircraft's airspeed, ground speed, altitude (e.g., relative to sea level), pitch, and other important flight information if such information is desired. In any event, for this example embodiment, flight management system 106 and/or navigation system 108 may include any suitable position and direction determination devices that are capable of providing processing unit 102 with at least an aircraft's current position (e.g., in latitudinal and longitudinal form), the real-time direction (heading, course, track, etc.) of the aircraft in its flight path, and other important flight information (e.g., airspeed, altitude, pitch, attitude, etc.).

For this embodiment, system 100 also includes graphics display generator 110 coupled to processing unit 102 (e.g., via an I/O bus connection) and visual display 112. Visual display 112 may also be coupled to processing unit 102 (e.g., via an I/O bus connection). For example, visual display 112 may include any device or apparatus suitable for displaying various types of computer-generated symbols and information, in an integrated, multi-color or monochrome form, representing one or more of pitch, heading, flight path, airspeed, altitude, targets, waypoints, terrain, flight path marker data, and notably, a graphical indication of the aircraft's progress in arriving at a predetermined location (e.g., waypoint) at a predetermined time. Using aircraft position, direction (e.g., heading, course, track, etc.), speed data retrieved (or received) from flight management system 106 and/or navigation system 108, wind data (e.g., speed, direction) and terrain (e.g., waypoint) data retrieved (or received) from database 104, processing unit 102 executes one or more algorithms (e.g., implemented in software) for determining the current position of the host aircraft, its heading (course, track, etc.), and computing an ETA for a predetermined location (e.g. waypoint) based on the aircraft's current speed. Processing unit 102 then generates a plurality of display control signals representing, among other things, a graphical indication showing the aircraft's progress in arriving at a predetermined location (e.g., waypoint) at a predetermined time, and sends the plurality of display control signals to visual display 112 via graphics display generator 110. Preferably, for this embodiment, visual display 112 is an aircraft cockpit, multi-color display (e.g., a Primary Flight Display). Graphics display generator 110 interprets the received plurality of display control signals and generates suitable display symbols, which are presented on a screen or monitor of visual display 112.

Regarding the RTA, flight management system 106 calculates maneuvering directions for the aircraft autopilot based on the current location and altitude of the aircraft relative to a specific waypoint along its flight plan and an RTA at that waypoint. At least some of these maneuvering directions are determined by the RTA system based upon the RTA included in the aircraft's flight plan. In some embodiments, the RTA may be calculated and configured by an RTA system configured to build a computerized profile of a flight plan of an aircraft in the vertical, lateral and temporal dimensions. Preferably, however, such functions are integrated into the flight management system 106. Although, one of ordinary skill in the art will appreciate that the RTA system may be incorporated into any suitable cockpit component as a sub-component or as a software module without departing from the scope of the disclosure herein.

Notably, although an existing cockpit display screen may be used to display the above-described flight information symbols and data, the present disclosure is not intended to be so limited and may include any suitable type of display medium capable of visually presenting multi-colored or monochrome flight information for a pilot or other flight crew member. As such, many known display monitors are suitable for displaying such flight information, such as, for example, various CRT and flat-panel display systems (e.g., CRT displays, LCDs, OLED displays, plasma displays, projection displays, HDDs, HUDs, etc.). For example, visual display 112 may be implemented as a heads-down Primary Flight Display by a DU-1080 Display Unit or DU-1310 Display Unit, which are color active matrix LCD-based devices produced by Honeywell International Inc. of Morristown, N.J. Also, an exemplary HUD that may be used for visual display 112 is the HUD2020 device also produced by Honeywell International Inc.

For this exemplary embodiment, graphics display generator 110 may be configured to provide to a screen or monitor of visual display 112 (e.g., responsive to operations of processing unit 102) at least visual symbols (e.g., preferably, but not necessarily, in graph form) that represent the aircraft's current speed, and also indicate to what extent the aircraft's speed should be increased or decreased in order for the aircraft to arrive at a predetermined location (e.g., waypoint, waypoint and altitude, etc.) at a predetermined time, and further indicate any constraints that may be present regarding the aircraft's speed. The predetermined location data may include, for example, data retrieved or received from a navigation database, traffic and collision avoidance system, up-linked data from an external database, data from a FLIR sensor or radar device, and/or any other suitable source of location information useful to a pilot or other flight crew member. The current speed data may include, for example, data from an onboard inertial guidance system, navigation system, flight management system, etc.

For this exemplary embodiment, graphics display generator 110 (e.g., responsive to operations of processing unit 102) may render a multi-colored (or monochrome) image on a screen of visual display 112, of a plurality of rectangular symbols that indicate the aircraft's current speed and to what extent the aircraft's speed should be increased or decreased in order for the aircraft to reach a predetermined location at a predetermined time, relevant speed constraint information, along with relevant navigation information (e.g., suitable symbols representing locations of man-made obstacles and natural obstacles, and other typical flight management information, etc.). Graphics display generator 110 (e.g., responsive to operations of processing unit 102) may also render multi-colored or monochromatic images of terrain and weather data on the screen of visual display 112.

A display system as illustrated in FIG. 1 may be used in connection with a flight crew deciding whether to accept an RTA control request from an ATC facility, and, once such control request is accepted, in monitoring the progress of the flight in connection with the RTA. Regarding the first question of whether to accept an RTA control request, a flight crew is typically interested in the following: How will the aircraft speed be changed if the RTA is accepted? Will the aircraft fly faster or slower with respect to the current speed? What is the relative magnitude of the speed change and what are the limits of RTA speed management algorithm in respect to aircraft speed envelope? Regarding the continued monitoring of an accepted RTA control request, the flight crew is typically interested in the following: What is the current range of the aircraft RTA speed management (i.e. what is the worst case behavior I may expect from RTA control algorithm)? Is the speed already saturated? How does RTA control speed range change with an altitude? Presentation of RTA control range limits increases situation awareness of the aircrew, gives crew insight into inner state of RTA control algorithm, facilitate decision making related to RTA constraint negotiation and help the pilot to monitor the aircraft speed management with respect to the RTA constraint. The presently described display systems are provided to address at least these issues.

As initially noted above, embodiments of the present disclosure generally provide systems and methods for displaying the speed impacts of the time constraint on the Primary Flight Display (PFD) of an aircraft, while the aircraft is in a "negotiation" phase and an "execution phase" of such time constraint. The display provides to the pilot (or aircrew) an overview of impacts of the RTA control strategy on aircraft speed in form of speed range indication and RTA target control speed. In the first, negotiation phase, the pilot needs to investigate the impact of the potential RTA constraint on the aircraft speed profile in order to decide whether the clearance is acceptable or not. If the pilot decides to accept the RTA constraint, the second, monitoring phase, is started. In this phase, the pilot needs continuous information about the aircraft systems' management of the RTA constraint. The two phases relate to different needs of the pilot which results in different ways of presentation of the RTA speed data as defined in greater detail below.

Broadly, while in the RTA negotiation phase, it is assumed that the aircrew has received an ATC instruction to accept or decline a time constrain in the active flight plan. In this instance, the pilot's decision whether to accept or decline is primarily based on the following considerations: the phase of flight in which the RTA shall be applied and the safety, performance, and business aspects, such as the impact on speed, altitude, fuel, and time of arrival, for example, among others. Before the time constraint is activated, it would be useful for the pilot to have knowledge of the new speed profile for conformance checking purposes. As such, the display systems and associated methods disclosed herein provide an "RTA pending state" of operation wherein a proposed first RTA speed adjustment and a proposed RTA speed range are displayed in suitable form on PFD, in conformance with the ATC instruction under consideration.

Furthermore, broadly, while in the RTA monitoring phase, the pilot needs to be provided with an appropriate level of information about the following: able/unable status of the RTA and the evolution of the time constraint in the speed domain. The speed domain information is important for pilot from several reasons, including to monitor the position of the actual speed target within the allowed RTA speed interval and to monitor the trend of the RTA speed target evolution with respect to the RTA speed interval. As such, the display systems and associated methods disclosed herein provide an "RTA monitoring state" of operation wherein both those aspect are reflected in the display.

Figure 2:
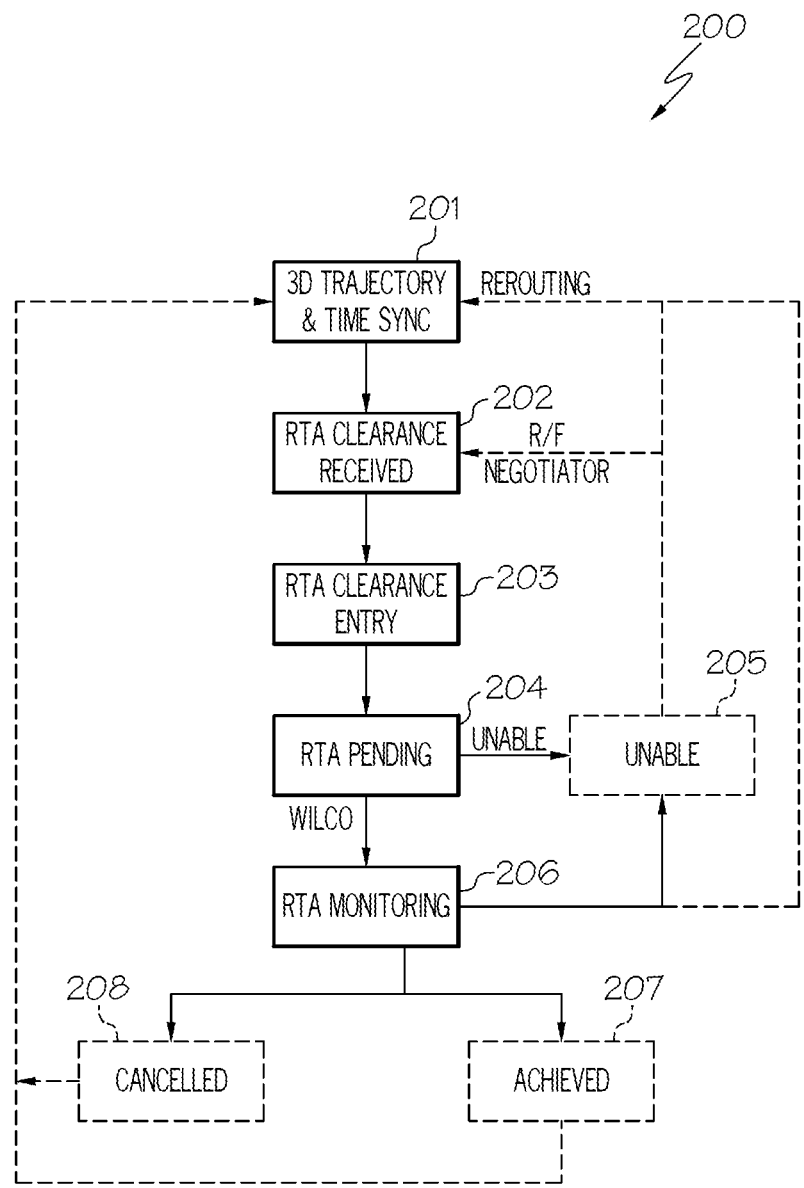
FIG. 2 is a flow diagram of a method implemented on a flight display system as shown in FIG. 1 for providing a display to a flight crew of an aircraft in accordance with various embodiments of the present disclosure.

An exemplary method 200 of providing a display indicating a required time of arrival to a flight crew of an aircraft is depicted in FIG. 2. As shown therein, method 200 includes an initial step of maintaining flight including a three-dimensional trajectory vector and a fourth dimension including time synchronization. As is known in the art, this is considered a "default" flight operational state for any known 4D trajectory environment. The lateral and vertical flight plans are synchronized between the airborne and the ground side. In SESAR i4D environment, the ground is aware by means of ADS-C with EPP (extended projected profile) technology of ETA and ETA minimum/maximum predictions for each or pre-defined waypoint. Of course, the presently described embodiments will be generally applicable even in the case that ADS-C EPP or other means of trajectory synchronization are not present in a particular aircraft or ground facility.

From the default flight condition, an RTA clearance control may be received by the flight crew of the aircraft as indicated at step 202 of method 200. ATC clearance may be received either via voice or by the CROSS type of CPDLC message, as is known in the art. The flight crew will notice, read, and accept the control request as "possible" in most situations wherein the crew is not aware of an immediate reason for rejecting the control request, for example an emergency situation.

As long as it is not initially rejected, the time constraint is entered into the FMS, as shown at step 203. Once entered, the time constraint is considered as "pending confirmation" (204)—that is, the system performs all of the required calculations for such constraint, as will be described in greater detail below, but does not make any flight control changes pending further input from the flight crew, after they have had an opportunity to review the proposed flight control changes. During "RTA pending" step (or phase) 204, the ETAs for all waypoints, the ETD (estimated time to destination), the impact on fuel, the minimum/maximum RTA control speed range, and the initial RTA target speed are displayed to the crew (exemplary displays are provided in greater detail below in connection with the discussion regarding FIGS. 3-6). Further, during RTA pending step 204, the flight crew evaluates all factors that could influence the safety of the flight (e.g., weather conditions, distance to alternates, on-board situation) or airline/customer policy, with the proposed speed constraint information readily available to them via the display, and decides to confirm or reject the time constraint clearance. That is, the minimum/maximum RTA control speed range and the initial RTA target speed display supports crew awareness of the immediate and worst case impact of the FMS RTA algorithm in relation to aircraft speed.

In the event that, for whatever reason, the flight crew decides that it is unable to accept the ATC RTA control request, as shown at step 205 ("Unable"), the method may revert to either step 201 or 202 for rerouting or alternative RTA clearance negotiation, if necessary. In case the FMS RTA algorithm is not capable to comply with the time constraint the crew is made aware about the fact by annunciation or by the display. In SESAR i4D, ATC is automatically informed via ADS-C with EPP. In such case ATC shall contact crew via voice and offer resolution, for example either the flight crew or ATC may request a route deviation.

If, on the other hand, the crew is able to accept the ATC RTA control request, as shown at step 206, the system enters an "RTA monitoring" phase, wherein the FMS is flying the RTA and the crew is monitoring the ability to comply with clearance on a portion of the display. During this phase, as in the pending phase, the minimum/maximum RTA control speed range and current RTA target speed display, as currently implemented by the FMS, supports crew awareness of current and worst case impact of FMS RTA algorithm on aircraft speed.

Thereafter, at steps 207 and 208, the RTA control may terminate either by the RTA being achieved, i.e., the desired waypoint has been reached, and the status of the RTA being actively flown and monitored is removed from the display, or by the RTA being cancelled, i.e., ATC cancels the time constraint by uplink message or by voice instruction, and the flight crew will remove the RTA from the given waypoint.

Various aspects regarding the RTA negotiation and monitoring phases are now provided in connection with the exemplary displays shown in FIGS. 3 through 6, and in particular the use of the RTA target speed range and limits for providing relevant information to the flight crew during the RTA negotiation and monitoring phases. With reference now in particular to FIGS. 3A and 3B, an exemplary portion 301 of a flight display is shown that indicates the airspeed of the aircraft to the flight crew, both in graphical and numerical format. In common parlance, this portion of the display is referred to as the "speed tape." With reference to FIGS. 3A and 3B, the speed tape 301 includes a first numerical current airspeed indicator 302, a graphical speed range indicator 303, a second numerical current airspeed indicator 304, an angle of attack ("AOA") indicator 306, a mach speed indicator 305, and a stall speed indicator 307. Each of these features are well-known to those having ordinary skill in the art, and as such a greater description regarding their function and operation is not provided herein.

Figure 3B:
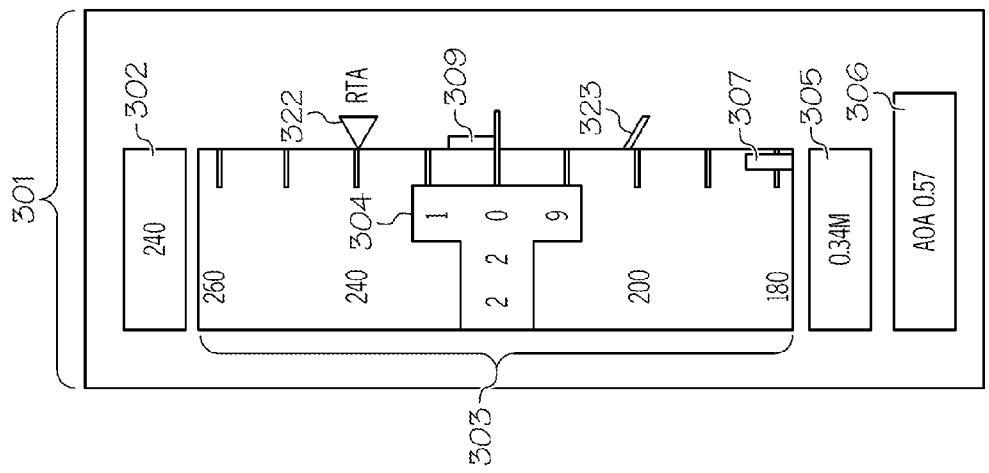
FIGS. 3A and 3B illustrate a portion of an exemplary flight display showing showing example of "negotiation and execution phase" with speed target as well as part of RTA speed range limit.
Figure 3A:
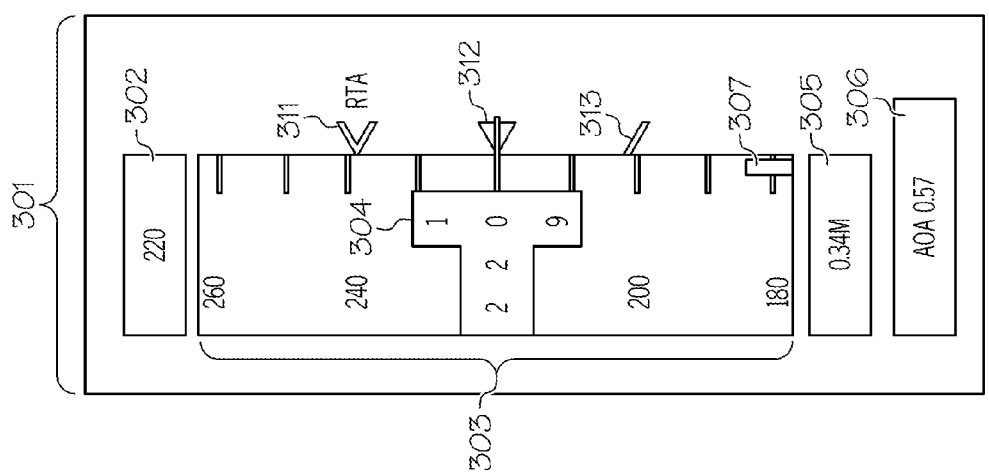

Regarding the features of the speed tape 301 specific to the RTA negotiation and monitoring phases, FIG. 3A represents the speed tape 301 in the negotiation phase, and FIG. 3B represents the speed tape 301 in the monitoring phase. As shown in FIG. 3A, the speed tape 301 includes a negotiation phase RTA target speed indicator 311, a current target speed indicator 312 (for example as set using the mode control panel), and a negotiation phase RTA lower speed range indicator 313. The RTA control speed range indicator 313 provides a graphical representation of speed range in which RTA speed will be controlled by the RTA algorithm. The initial RTA target speed 311 informs the pilot about predicted initial speed adjustment by its position within RTA control speed range about future possible speed adjustments. The fact that those values belong to a pending flight plan are indicated by a first symbology, such as a first color, a first shape, a first patterning, or the like. If the RTA control speed range value is out of speed tape view, it is not displayed. In FIG. 3A, it may be seen that RTA target speed 311 is placed above current speed, and as a result the aircraft will speed up (if RTA is accepted). In an alternative embodiment, the speed tape 301 may also display maximum/minimum RTA speed limit indications that are out of speed tape view, for example, with different symbols, accompanied by, a numerical value, etc.

Upon acceptance of the RTA target, as shown in FIG. 3B, the symbology changes such that the target speed becomes a current RTA target speed 322 and moves to where the negotiation phase RTA target speed 311 was. The speed tape 301 thus indicates acceleration by the autothrottle (309) to meet the current RTA target speed. The negotiation phase RTA lower speed range indicator 313 also changes symbology to a current RTA lower speed range indicator 323, for example a change in color, shape, pattern, etc.

Figure 4B:
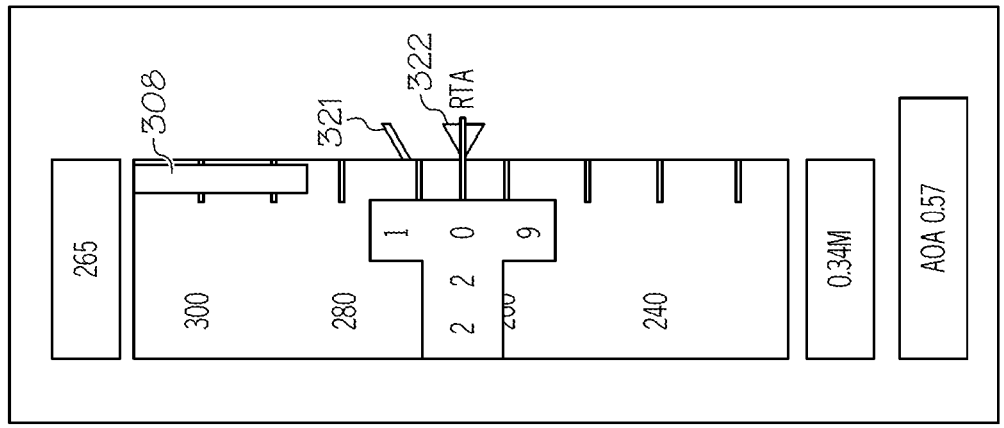
FIGS. 4A and 4B illustrate a portion of an exemplary flight display showing another example of "execution phase" with speed target and part of RTA speed range limit.
Figure 4A:
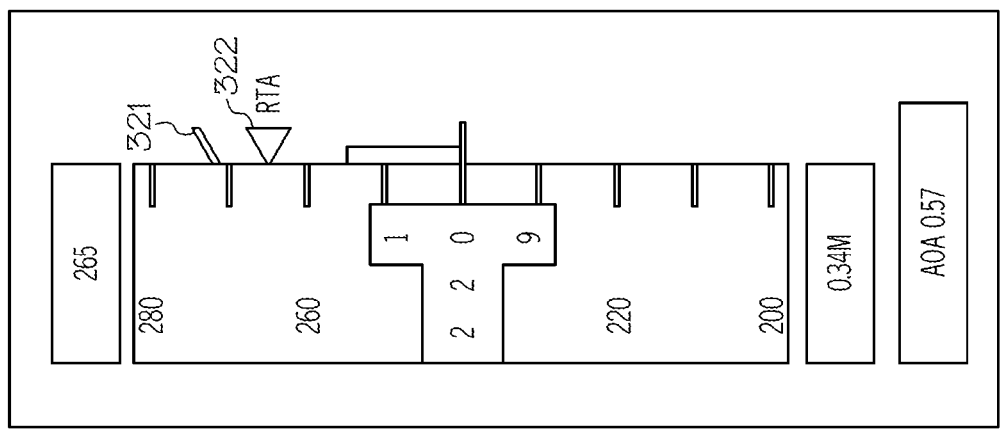

FIGS. 4A and 4B illustrate the RTA monitoring phase including a current RTA upper speed range indicator 321. As shown, the system is accelerating to the current RTA target. In general, the current RTA control speed range during the monitory phase represents limits of the RTA speed control algorithm that may be used for a given configuration (it changes with altitude, wind margins used, etc.). The range may be further indirectly limited by pilot settings to the FMS (e.g., cost index) and represents maximum/minimum allowed speeds for RTA algorithm. Indicators of these control speed limits are displayed only when speed tape is in appropriate range of indicators visibility. If RTA control speed limit value is out of speedtape view, control speed limits are not displayed to decrease the speed tape clutter (as both speed limits are always present when RTA algorithm is active).

Figure 5B:
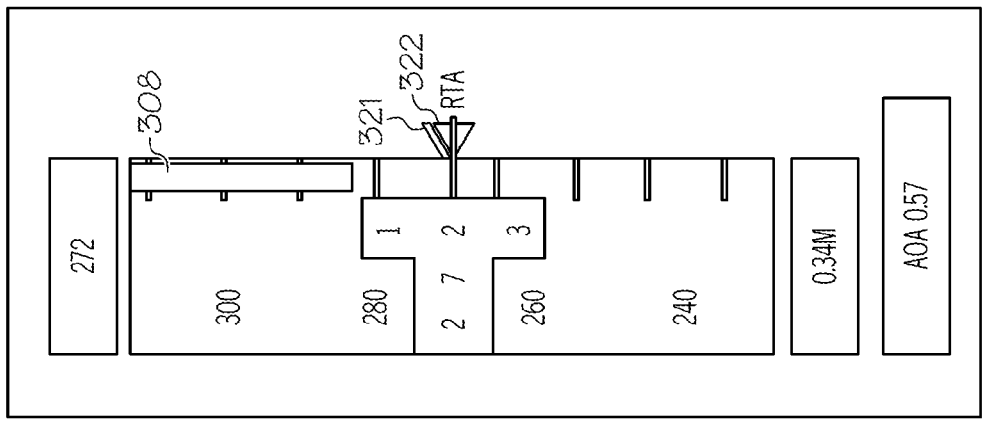
FIGS. 5A through 5D illustrate a portion of an exemplary flight display showing another example of "execution phase—RTA speed saturation" with speed target in connection with RTA speed range limit value.
Figure 5A:
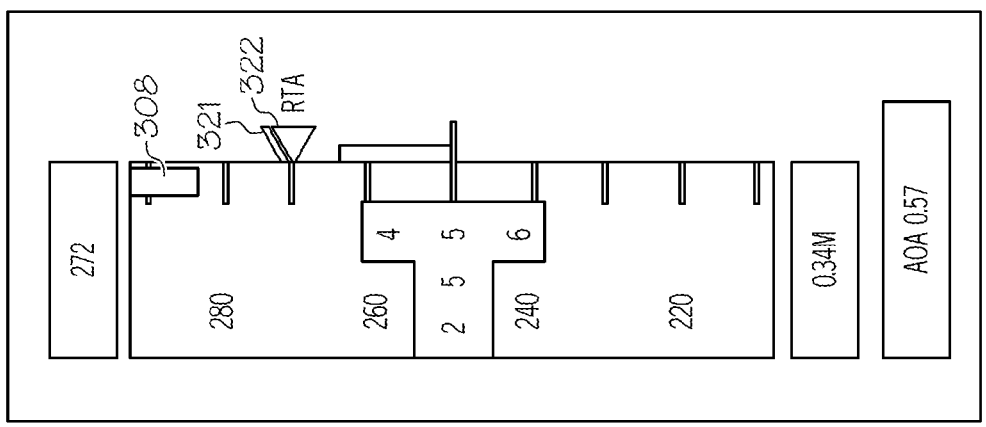
Figure 5D:
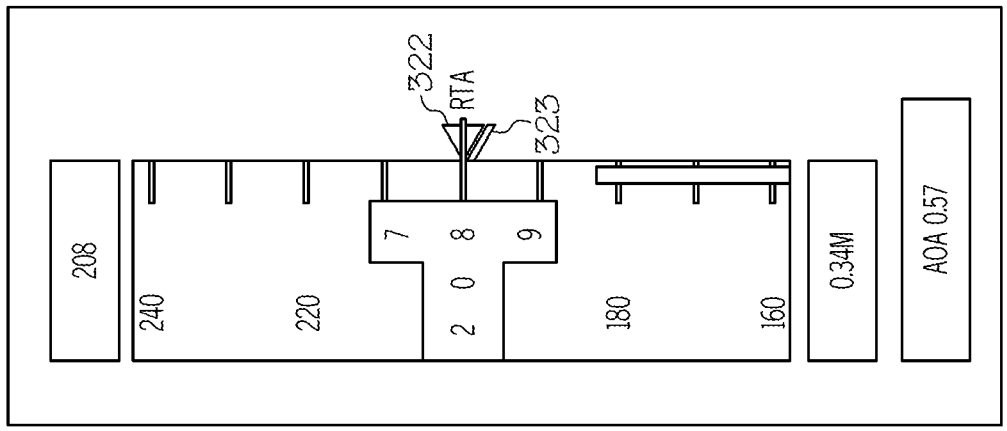
Figure 5C:
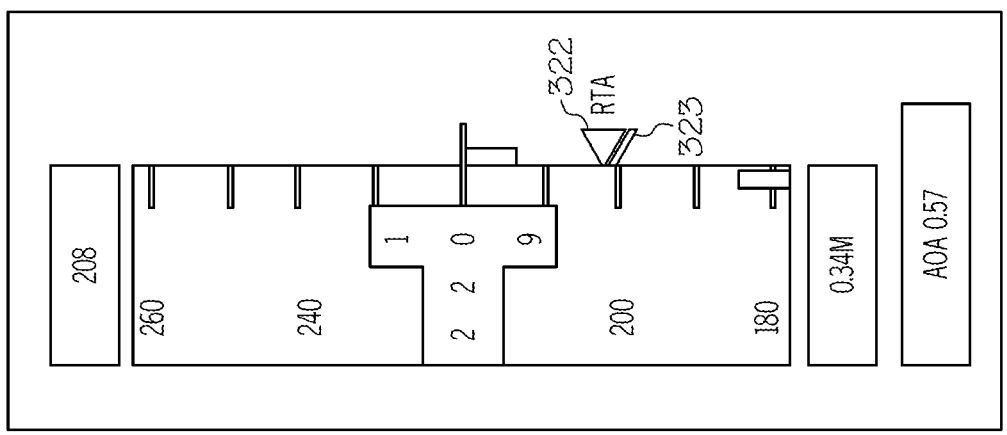

FIGS. 5A through 5D illustrate a "saturated" airspeed condition, wherein the current RTA target speed 322 in the monitoring phase is saturated to the current RTA upper speed range indicator 321/current RTA lower speed range indicator 323 (not displayed). FIG. 5A shows the autothrottle accelerating to the upper limit saturation, and FIG. 5B shows the autothrottle maintaining speed at the upper limit saturation. Further, FIG. 5C shows the autothrottle decelerating to the lower limit saturation, and FIG. 5D shows the autothrottle maintaining speed at the lower limit saturation. When the RTA speed is saturated—i.e. when the RTA speed target hits upper or lower RTA control speed limit (321, 323)—it does not mean that the RTA is immediately missed. It shall be noted that it is the nature of the solved problem—which is time of arrival control by speed adjustments and changes in environment with uncertain tail/head wind prediction data—that is causing that the RTA control algorithm cannot be designed so that the saturated state is skipped over. After speed is saturated at the limits, the achievability of RTA depends on further wind/temperature development. If RTA speed range does not allow further speed adjustments, after certain time (in range 0.5-2.0 minutes) 'RTA UNABLE' state is declared and RTA text connected with speed target will switch to another symbology indication, for example another color. In another embodiment, speed saturation may also be indicated by a change in symbology, such as a change in color, shape, pattern, etc.

In yet another embodiment, if the target speed (either in negotiation phase or monitoring phase), the target indicator may be displayed in a top (or bottom) region 350 of the speed tape, with only a partial symbol. As shown in FIG. 6A, the initial RTA target speed indicator 311 is partially indicated at the region 350 during the negotiation phase, and as shown in FIG. 6B, the current RTA target speed indicator 322 is partially indicated at the region 350 during the monitoring phase (as shown, the aircraft is also accelerating). For example, in negotiation phase, it may happen, that the first computed RTA target speed may exceed given upper/lower RTA speed range. In such case, RTA text beside the speed target indicator will change to one format (RTA is considered as UNABLE even before it is activated). IF ABLE is the case, RTA text would be in another format.

As such, the present disclosure has set forth an improved flight display system with numerous benefits over the prior art. The present disclosure provides systems and methods for displaying the speed impacts of the time constraint on the Primary Flight Display (PFD) of an aircraft, while the aircraft is in a "negotiation" phase and an "execution phase" of such time constraint. The display provides to the pilot (or aircrew) an overview of impacts of the RTA control strategy on aircraft speed in form of speed range indication and RTA target control speed.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A method for providing a display to a flight crew of an aircraft comprising the steps of:
    receiving a required time of arrival (RTA) control instruction for arriving at a particular waypoint at a particular time;
    calculating an initial required aircraft speed at which the aircraft is required to fly in order to arrive at the particular waypoint at the particular time;
    providing a flight display comprising a speed tape, wherein the speed tape comprises an initial RTA target speed that is graphically displayed using a first symbology, wherein the initial RTA target speed correlates with the initial required aircraft speed, and wherein providing the flight display is not accompanied with a concurrent aircraft speed change to match the initial target speed;
    receiving an input accepting the RTA control instruction;
    calculating an updated required aircraft speed at which the aircraft is required to fly in order to arrive at the particular waypoint at the particular time, wherein, if a change in flight conditions has occurred between the steps of calculating the initial required aircraft speed and calculating the updated required aircraft speed, the updated required aircraft speed is either faster or slower than the required aircraft speed;
    updating the flight display comprising displaying the updated RTA target speed on the speed tape using a second symbology that is different from the first symbology and discontinuing the display of the first symbology; and
    providing an instruction to the autothrottle of the aircraft to fly the aircraft at the updated RTA target speed.

2. The method of claim 1, wherein the first symbology is a first color and the second symbology is a second color that differs from the first color.

3. The method of claim 1, wherein the first symbology is a first shape and the second symbology is a second shape that differs from the first shape.

4. The method of claim 1, wherein receiving the RTA control instruction comprises receiving the control instruction from a ground-based automated control instruction issuing system.

5. The method of claim 1, wherein receiving the RTA control instruction comprises receiving the control instruction from a pilot input.

6. The method of claim 1, wherein providing the flight display comprising the initial target RTA speed further comprises providing a flight display with an initial upper RTA speed range indicator symbol, positioned along the speed tape, that is greater than the initial target RTA speed, wherein the initial upper RTA speed range represents an estimate of a maximum speed within a range of speeds and is calculated along with the initial target RTA speed.

7. The method of claim 6, wherein updating the flight display comprising the updated target RTA speed further comprises providing a flight display with an updated upper RTA speed range indicator symbol, positioned along the speed tape, that is greater than the updated target RTA speed, wherein the updated upper RTA speed range represents an updated estimate of a maximum speed at which the aircraft may fly in order to achieve the RTA and is calculated along with the updated target RTA speed, wherein a symbology of the updated upper RTA speed range is different than a symbology of the initial upper RTA speed range.

8. The method of claim 1, wherein providing the flight display comprising the initial target RTA speed further comprises providing a flight display with an initial lower RTA speed range indicator symbol, positioned along the speed tape, that is less than the initial target RTA speed, wherein the initial lower RTA speed range represents an estimate of a minimum speed within a range of speeds and is calculated along with the initial target RTA speed.

9. The method of claim 8, wherein updating the flight display comprising the updated target RTA speed further comprises providing a flight display with an updated lower RTA speed range indictor symbol, positioned along the speed tape, that is lower than the updated target RTA speed, wherein the updated lower RTA speed range represents an updated estimate of a minimum speed at which the aircraft may fly in order to achieve the RTA and is calculated along with the updated target RTA speed, wherein a symbology of the updated lower RTA speed range is different than a symbology of the initial lower RTA speed range.

10. The method of claim 1, wherein receiving an input accepting the RTA control instruction comprises receiving an input from the flight crew.

11. A display system configured to provide a display to a flight crew of an aircraft comprising:
an image display device;
a communications interface;
a data storage device that stores navigation information;
a flight management system comprising an autothrottle functionality; and
an RTA control system in operable electronic communication with the image display device, the communications interface the data storage device, and the flight management system, wherein the RTA control system comprises a computer processor that is configured to:
receive a required time of arrival (RTA) control instruction through the communications interface for arriving at a particular waypoint at a particular time;
calculate an initial required aircraft speed at which the aircraft is required to fly in order to arrive at the particular waypoint at the particular time;
generate and send to the image display device a flight display comprising a speed tape, wherein the speed tape comprises an initial RTA target speed that is graphically displayed using a first symbology, wherein the initial RTA target speed correlates with the initial required aircraft speed, and wherein generating the flight display is not accompanied with a concurrent aircraft speed change command to the flight management system to match the initial target speed;
receive an input accepting the RTA control instruction through the communications interface;
calculate an updated required aircraft speed at which the aircraft is required to fly in order to arrive at the particular waypoint at the particular time, wherein, if a change in flight conditions has occurred between calculating the initial required aircraft speed and calculating the updated required aircraft speed, the updated required aircraft speed is either faster or slower than the required aircraft speed;
generate and send to the image display device an updated flight display comprising the updated RTA target speed on the speed tape using a second symbology that is different from the first symbology and discontinue the display of the first symbology; and
provide an instruction to the flight management system to cause the autothrottle of the aircraft to fly the aircraft at the updated RTA target speed.

12. A method for providing a display to a flight crew of an aircraft comprising the steps of:
receiving a required time of arrival (RTA) control instruction for arriving at a particular waypoint at a particular time;
calculating an initial required aircraft speed at which the aircraft is required to fly in order to arrive at the particular waypoint at the particular time;
providing, as part of the aircraft primary flight display (PFD), an RTA pending-mode flight display comprising a speed tape, wherein the speed tape comprises an initial RTA target speed that is graphically displayed using a first symbology, wherein the initial RTA target speed is different than a current speed of the aircraft, wherein the initial RTA target speed is the same as the initial required aircraft speed, and wherein providing the flight display is not accompanied with a concurrent aircraft speed change to match the initial target speed or a command to change the current speed of the aircraft to match the initial target speed;
subsequent to providing the RTA pending-mode flight display, receiving an input accepting the RTA control instruction;
subsequent to receiving the input accepting the RTA control instruction, calculating an updated required aircraft speed at which the aircraft is required to fly in order to arrive at the particular waypoint at the particular time, wherein, if a change in flight conditions has occurred between the steps of calculating the initial required aircraft speed and calculating the updated required aircraft speed, the updated required aircraft speed is either faster or slower than the required aircraft speed;
subsequent to calculating the updated required aircraft speed, updating the flight display to an RTA monitoring-mode comprising displaying, as part of the aircraft PFD, the updated RTA target speed on the speed tape using a second symbology that is different from the first symbology and concurrently discontinuing the display of the RTA pending-mode flight display; and
concurrently with or subsequent to updating the flight display to the RTA monitoring-mode, providing an instruction to the autothrottle of the aircraft to fly the aircraft at the updated RTA target speed and causing the aircraft to accelerate or decelerate to fly at the updated RTA target speed.

13. The method of claim 12, wherein providing the flight display comprising the initial target RTA speed further comprises providing a flight display with an initial upper RTA speed range indicator symbol, positioned along the speed tape, that is greater than the initial target RTA speed but less than a maximum aircraft speed, wherein the initial upper RTA speed range represents an estimate of a maximum speed within a range of acceptable RTA-mode speeds and is calculated along with the initial target RTA speed.

14. The method of claim 13, wherein updating the flight display comprising the updated target RTA speed further comprises providing a flight display with an updated upper RTA speed range indicator symbol, positioned along the speed tape, that is greater than the updated target RTA speed but less than a maximum aircraft speed, wherein the updated upper RTA speed range represents an updated estimate of a maximum speed within the range of acceptable RTA-mode speeds at which the aircraft may fly in order to achieve the RTA and is calculated along with the updated target RTA speed, wherein a symbology of the updated upper RTA speed range is different than a symbology of the initial upper RTA speed range.

15. The method of claim 14, wherein providing the flight display comprising the initial target RTA speed further comprises providing a flight display with an initial lower RTA speed range indicator symbol, positioned along the speed tape, that is less than the initial target RTA speed but greater than a minimum aircraft speed, wherein the initial lower RTA speed range represents an estimate of a minimum speed within a range of acceptable RTA-mode speeds and is calculated along with the initial target RTA speed.

16. The method of claim 15, wherein updating the flight display comprising the updated target RTA speed further comprises providing a flight display with an updated lower RTA speed range indictor symbol, positioned along the speed tape, that is lower than the updated target RTA speed but greater than the minimum aircraft speed, wherein the updated lower RTA speed range represents an updated estimate of a minimum speed within a range of acceptable RTA-mode speeds at which the aircraft may fly in order to achieve the RTA and is calculated along with the updated target RTA speed, wherein a symbology of the updated lower RTA speed range is different than a symbology of the initial lower RTA speed range.

17. The method of claim 16 further comprising, as part of providing the RTA pending-mode flight display, displaying a current speed graphical indicator symbol along the speed tape that graphically indicates the current speed of the aircraft with respect to a position along the speed tape.

18. The method of claim 1, wherein providing the flight display further comprises displaying a current speed graphical indicator symbol, separate from the first symbology, along the speed tape that graphically indicates the current speed of the aircraft with respect to a first position along the speed tape, and wherein the first symbology is provided along the speed tape to graphically indicate the initial target speed with respect to a second position along the speed tape.

* * * * *